United States Patent
Lee et al.

(10) Patent No.: US 9,858,429 B2
(45) Date of Patent: Jan. 2, 2018

(54) METHODS OF DATA TRANSFER IN ELECTRONIC DEVICES

(71) Applicant: Samsung Electronics Co., Ltd., Suwon-si, Gyeonggi-do (KR)

(72) Inventors: Seung-Ho Lee, Hwaseong-si (KR); Ki-Hyoun Kwon, Hwaseong-si (KR); Sung-Hoon Son, Suwon-si (KR); Jun-Ho Lee, Hwaseong-si (KR); Jerome Han, Daejeon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 82 days.

(21) Appl. No.: 14/955,192

(22) Filed: Dec. 1, 2015

(65) Prior Publication Data
US 2016/0154967 A1 Jun. 2, 2016

Related U.S. Application Data

(60) Provisional application No. 62/085,756, filed on Dec. 1, 2014.

(30) Foreign Application Priority Data

Jan. 23, 2015 (KR) .................. 10-2015-0011003

(51) Int. Cl.
*G06F 21/00* (2013.01)
*G06F 21/60* (2013.01)
(Continued)

(52) U.S. Cl.
CPC ............ *G06F 21/606* (2013.01); *G06F 21/30* (2013.01); *G06F 21/445* (2013.01); *G06F 21/602* (2013.01); *G06F 21/6245* (2013.01); *G06F 21/70* (2013.01); *H04L 9/0844* (2013.01); *H04L 9/0869* (2013.01); *H04L 9/3268* (2013.01); *G06F 2221/2129* (2013.01); *H04L 2209/88* (2013.01)

(58) Field of Classification Search
CPC .......... G06F 21/30; G06F 21/70; G06F 21/72; G06F 21/78; G06F 21/445; G06F 21/602;
(Continued)

(56) References Cited

U.S. PATENT DOCUMENTS 6,704,871 B1 * 3/2004 Kaplan ................... G06F 21/72
713/192
7,557,941 B2 * 7/2009 Walmsley ............. G06F 21/606
358/1.14
(Continued)

FOREIGN PATENT DOCUMENTS

EP 2503809 A1 9/2012

*Primary Examiner* — Hosuk Song
(74) *Attorney, Agent, or Firm* — Harness, Dickey & Pierce, P.L.C.

(57) ABSTRACT

A method of data transfer in an electronic device including a secure module, which includes a processor and a secure element, an application processor, and a sensor, may include: switching an operation mode of the processor to a bypass mode; performing a cross-authentication, by the application processor and the secure element; generating a session key, by the application processor and the secure element, when the cross-authentication is succeeded; switching the operation mode of the processor to a normal mode; encrypting, by the secure module, sensing data provided by the sensor using the session key; transferring the encrypted sensing data from the processor to the application processor; and/or acquiring, by the application processor, the sensing data by decrypting the encrypted sensing data using the session key.

20 Claims, 15 Drawing Sheets

(51) Int. Cl.
  *G06F 21/70* (2013.01)
  *G06F 21/30* (2013.01)
  *H04L 9/32* (2006.01)
  *H04L 9/08* (2006.01)
  *G06F 21/44* (2013.01)
  *G06F 21/62* (2013.01)

(58) Field of Classification Search
  CPC ... G06F 21/606; H04L 9/0844; H04L 9/0869; H04L 9/3268
  USPC ..... 713/168–170, 189, 193; 380/44; 726/27, 726/30
  See application file for complete search history.

(56) References Cited

U.S. PATENT DOCUMENTS

| | | | |
|---|---|---|---|
| 8,156,322 B2 * | 4/2012 | Asnaashari | G06F 21/34 713/150 |
| 8,386,796 B2 | 2/2013 | Suzuki et al. | |
| 8,447,969 B2 | 5/2013 | Robinton et al. | |
| 8,489,898 B2 * | 7/2013 | Wong | G06F 21/10 713/192 |
| 8,494,576 B1 | 7/2013 | Bye et al. | |
| 8,539,605 B2 * | 9/2013 | Ito | G06F 21/80 713/189 |
| 8,571,221 B2 * | 10/2013 | Little | G06F 21/72 380/255 |
| 8,646,059 B1 | 2/2014 | von Behren et al. | |
| 8,737,621 B2 | 5/2014 | Pelly et al. | |
| 8,762,742 B2 | 6/2014 | Buer | |
| 8,805,434 B2 | 8/2014 | Vasudevan | |
| 2009/0164797 A1 | 6/2009 | Kramer | |
| 2013/0013261 A1 | 1/2013 | Niessen et al. | |
| 2014/0013406 A1 | 1/2014 | Tremlet | |
| 2014/0181959 A1 | 6/2014 | Li et al. | |
| 2014/0317686 A1 | 10/2014 | Vetillard | |
| 2014/0344945 A1 | 11/2014 | Buer et al. | |

* cited by examiner

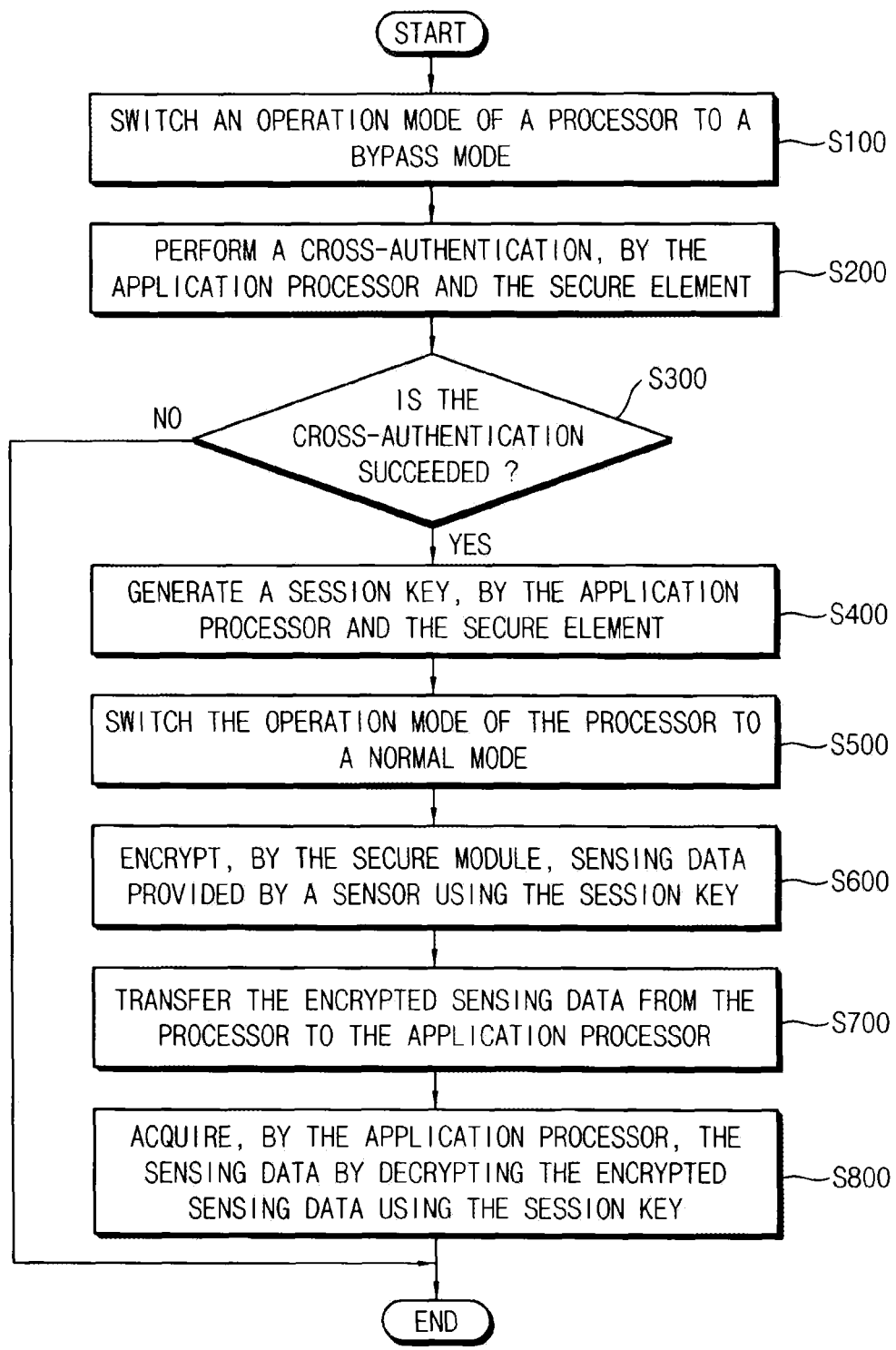

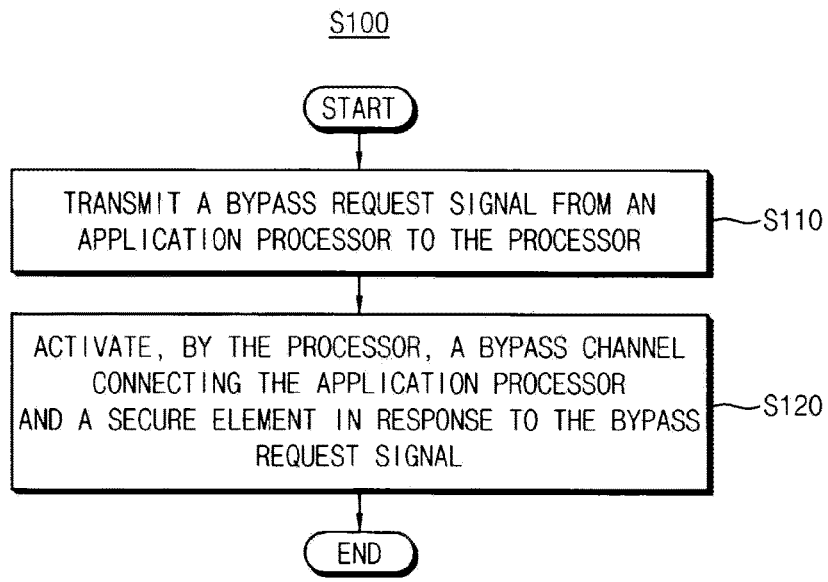
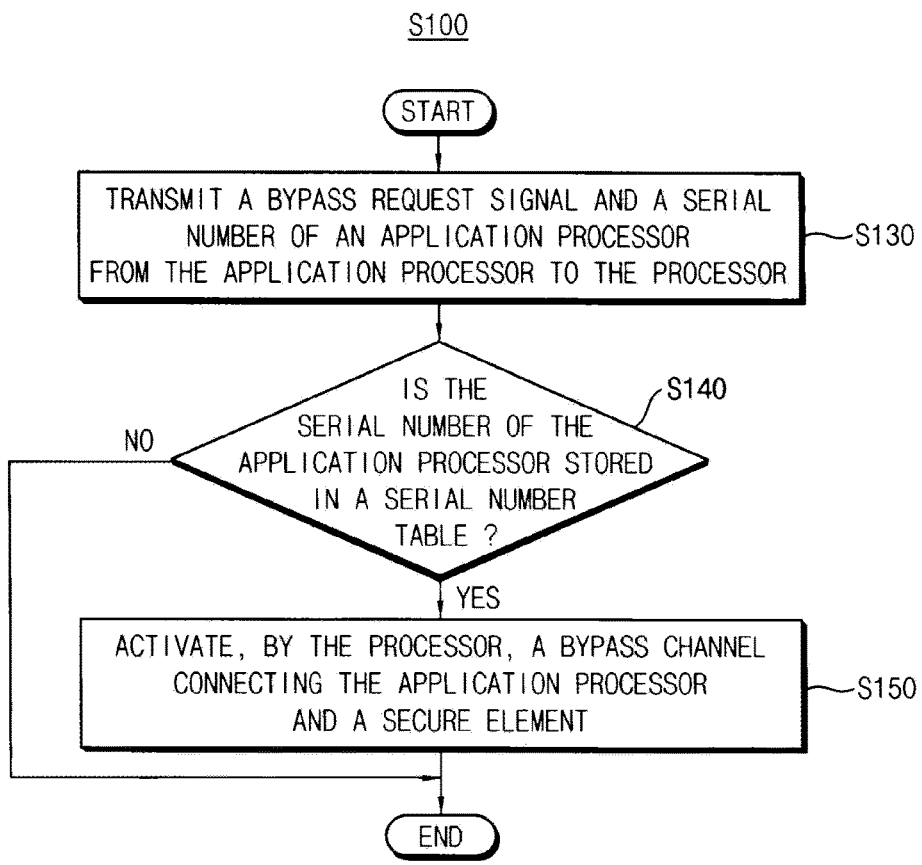

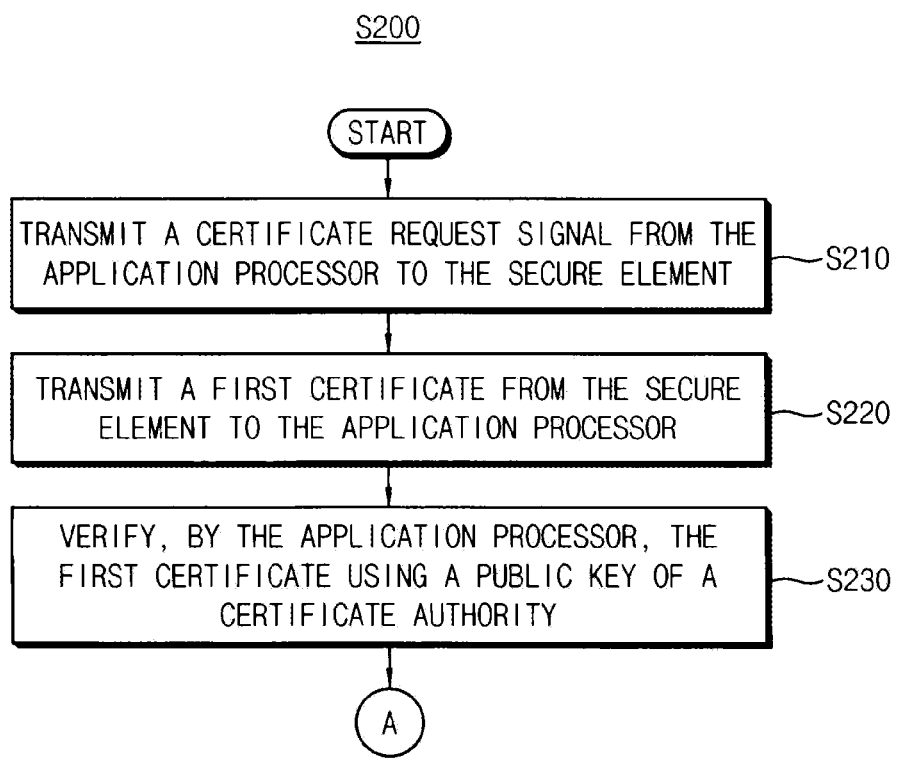

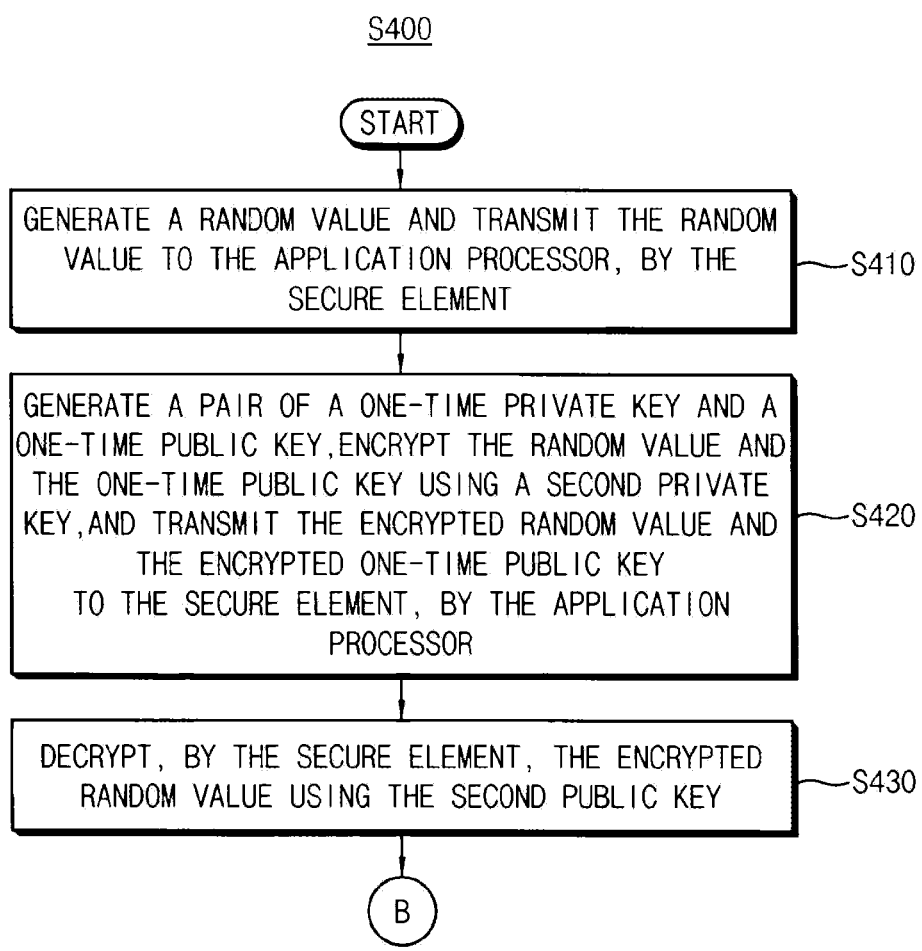

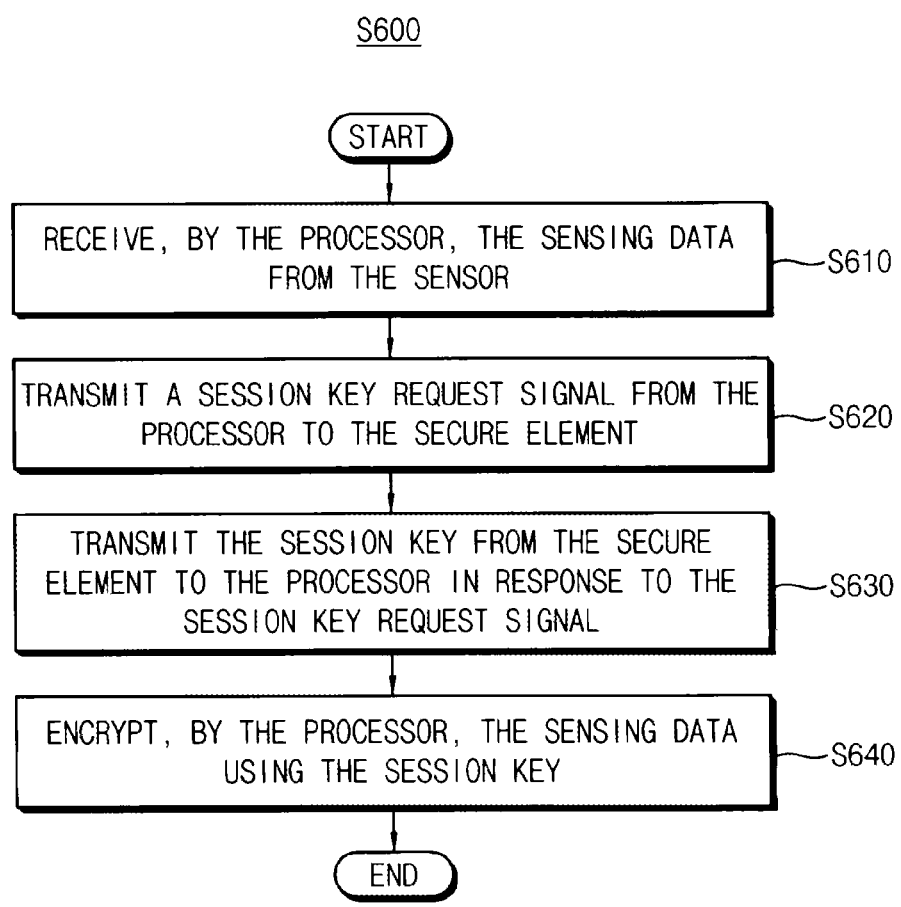

METHODS OF DATA TRANSFER IN ELECTRONIC DEVICES

CROSS-REFERENCE TO RELATED APPLICATION(S)

This application claims the benefit of U.S. Provisional Application No. 62/085,756, filed on Dec. 1, 2014, in the United States Patent and Trademark Office (USPTO), and claims priority from Korean Patent Application No. 10-2015-0011003, filed on Jan. 23, 2015, in the Korean Intellectual Property Office (KIPO), the entire contents of both of which are incorporated herein by reference.

BACKGROUND

1. Field

Some example embodiments may relate generally to electronic devices. Some example embodiments may relate generally to methods of data transfer in electronic devices.

2. Description of Related Art

Recently, electronic systems, such as mobile devices, may perform various kinds of functions using security data, such as personal information, cryptographic keys, etc.

If the electronic system is attacked while the security data are transferred between elements of the electronic system, the security data may be leaked.

Therefore, a method of transferring data securely between elements of the electronic system may be required.

SUMMARY

Some example embodiments may provide methods of transferring data securely in electronic devices.

Some example embodiments may provide electronic devices that may perform the methods of data transfer.

In some example embodiments, a method of data transfer in an electronic device including a secure module, which includes a processor and a secure element, an application processor, and a sensor, may comprise: switching an operation mode of the processor to a bypass mode; performing a cross-authentication, by the application processor and the secure element; generating a session key, by the application processor and the secure element, when the cross-authentication is succeeded; switching the operation mode of the processor to a normal mode; encrypting, by the secure module, sensing data provided by the sensor using the session key; transferring the encrypted sensing data from the processor to the application processor; and/or acquiring, by the application processor, the sensing data by decrypting the encrypted sensing data using the session key.

In some example embodiments, the secure module, which includes the processor and the secure element, may be formed in one package.

In some example embodiments, the processor may be coupled to the application processor through an external electrode of the one package. The secure element may be coupled to the processor through an internal bus formed in the one package.

In some example embodiments, the processor may be configured to communicate with the application processor in the normal mode. The processor may be further configured to bypass a signal received from the application processor to the secure element in the bypass mode. The processor may be further configured to bypass a signal received from the secure element to the application processor in the bypass mode.

In some example embodiments, the switching of the operation mode of the processor to the bypass mode may include: transmitting a bypass request signal from the application processor to the processor; and/or activating, by the processor, a bypass channel connecting the application processor and the secure element in response to the bypass request signal.

In some example embodiments, the switching of the operation mode of the processor to the bypass mode may include: transmitting a bypass request signal and a serial number of the application processor from the application processor to the processor; determining, by the processor, whether the serial number of the application processor is stored in a serial number table in response to the bypass request signal; and/or activating, by the processor, a bypass channel connecting the application processor and the secure element when the serial number of the application processor is stored in the serial number table.

In some example embodiments, the secure element may be configured to store a first private key of the secure element, a public key of a certificate authority, and a first certificate corresponding to the secure element issued by the certificate authority. The application processor may be configured to store a second private key of the application processor, the public key of the certificate authority, and a second certificate corresponding to the application processor issued by the certificate authority.

In some example embodiments, the performing of the cross-authentication, by the application processor and the secure element, may include: transmitting a certificate request signal from the application processor to the secure element; transmitting the first certificate from the secure element to the application processor in response to the certificate request signal; verifying, by the application processor, the first certificate using the public key of the certificate authority; acquiring, by the application processor, a first public key of the secure element included in the first certificate when the verification of the first certificate is succeeded; transmitting a verification request signal and the second certificate from the application processor to the secure element; verifying, by the secure element, the second certificate using the public key of the certificate authority in response to the verification request signal; and/or acquiring, by the secure element, a second public key of the application processor included in the second certificate when the verification of the second certificate is succeeded.

In some example embodiments, the generating of the session key, by the application processor and the secure element, may include: generating, by the secure element, a random value; transmitting the random value from the secure element to the application processor; generating, by the application processor, a pair of a one-time private key and a one-time public key; encrypting, by the application processor, the random value and the one-time public key using the second private key; transmitting the encrypted random value and the encrypted one-time public key from the application processor to the secure element; decrypting, by the secure element, the encrypted random value using the second public key; acquiring, by the secure element, the one-time public key by decrypting the encrypted one-time public key using the second public key when the decrypted random value is identical to the random value; calculating, by the secure element, a secret value based on the first private key and the one-time public key; generating, by the secure element, the session key and a first verification value based on the secret value; transmitting the first verification value from the secure element to the application processor;

calculating, by the application processor, the secret value based on the first public key and the one-time private key; generating, by the application processor, a second verification value based on the secret value; and/or generating, by the application processor, the session key based on the secret value when the second verification value is identical to the first verification value.

In some example embodiments, the encrypting, by the secure module, of the sensing data provided by the sensor using the session key may include: receiving, by the processor, the sensing data from the sensor; transmitting a session key request signal from the processor to the secure element; transmitting the session key from the secure element to the processor in response to the session key request signal; and/or encrypting, by the processor, the sensing data using the session key.

In some example embodiments, the encrypting, by the secure module, of the sensing data provided by the sensor using the session key may include: receiving, by the processor, the sensing data from the sensor; transmitting an encryption request signal and the sensing data from the processor to the secure element; encrypting, by the secure element, the sensing data using the session key in response to the encryption request signal; and/or transmitting the encrypted sensing data from the secure element to the processor.

In some example embodiments, the sensor may be included in the secure module.

In some example embodiments, the application processor may include a trusted execution environment (TEE) and a rich operating system execution environment (REE). The application processor may be configured to communicate with the secure module through the trusted execution environment.

In some example embodiments, a method of data transfer in an electronic device including a secure module, which includes a processor and a secure element, and an application processor, may comprise: switching an operation mode of the processor to a bypass mode; performing a cross-authentication, by the application processor and the secure element; generating a session key, by the application processor and the secure element, when the cross-authentication is succeeded; switching the operation mode of the processor to a normal mode; encrypting, by the secure module, security data stored in the secure element using the session key; transferring the encrypted security data from the processor to the application processor; and/or acquiring, by the application processor, the security data by decrypting the encrypted security data using the session key.

In some example embodiments, the encrypting, by the secure module, of the security data stored in the secure element using the session key may include: transmitting a data request signal from the processor to the secure element; transmitting the session key and the security data from the secure element to the processor in response to the data request signal; and/or encrypting, by the processor, the security data using the session key.

In some example embodiments, the encrypting, by the secure module, of the security data stored in the secure element using the session key may include: transmitting a data request signal from the processor to the secure element; encrypting, by the secure element, the security data using the session key in response to the data request signal; and/or transmitting the encrypted security data from the secure element to the processor.

In some example embodiments, a method of data transfer in an electronic device including a secure module, which includes a processor and a secure element, an application processor, and a sensor may comprise: performing a cross-authentication, by the application processor and the secure element, while bypassing the processor; generating a session key, by the application processor and the secure element, when the cross-authentication is succeeded; encrypting, by the secure module, sensing data provided by the sensor using the session key; transferring the encrypted sensing data from the processor to the application processor; and/or acquiring, by the application processor, the sensing data by decrypting the encrypted sensing data using the session key.

In some example embodiments, the performing of the cross-authentication while bypassing the processor may include: activating a bypass channel configured to allow the application processor to transmit information to the secure element.

In some example embodiments, the performing of the cross-authentication while bypassing the processor may include: activating a bypass channel configured to allow the secure element to transmit information to the application processor.

In some example embodiments, the performing of the cross-authentication while bypassing the processor may include: activating a bypass channel configured to allow the application processor to transmit information to the secure element, and configured to allow the secure element to transmit information to the application processor.

BRIEF DESCRIPTION OF THE DRAWINGS

The above and/or other aspects and advantages will become more apparent and more readily appreciated from the following detailed description of example embodiments, taken in conjunction with the accompanying drawings, in which:

FIG. 2 is a flowchart illustrating a method of data transfer in an electronic device according to some example embodiments;

FIG. 3 is a flowchart illustrating an example of a process of switching an operation mode of a processor to a bypass mode of FIG. 2;

FIG. 4 is a flowchart illustrating another example of a process of switching an operation mode of a processor to a bypass mode of FIG. 2;

FIGS. 5A and 5B are flowcharts illustrating an example of a process of performing a cross-authentication, by the application processor and the secure element of FIG. 2;

FIGS. 6A and 6B are flowcharts illustrating an example of a process of generating a session key, by the application processor and the secure element of FIG. 2;

FIG. 7 is a flowchart illustrating an example of a process of encrypting, by a secure module, sensing data provided by a sensor using the session key of FIG. 2;

DETAILED DESCRIPTION

Figure 1:
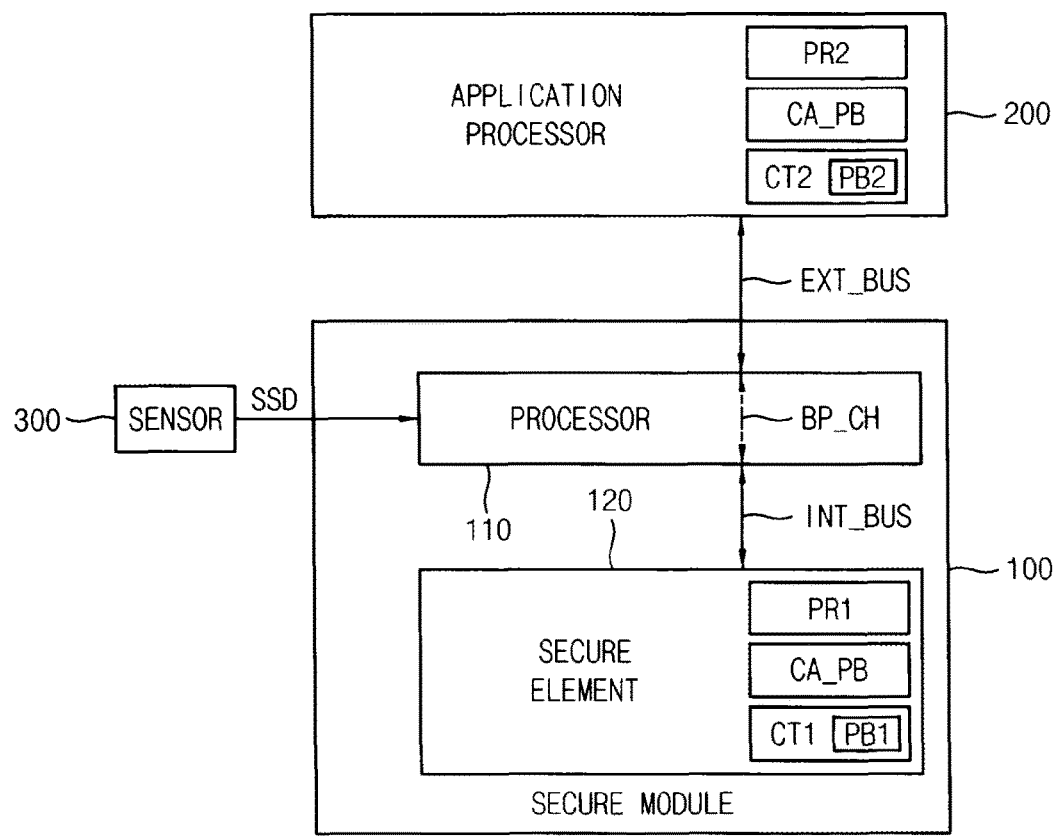
FIG. 1 is a block diagram illustrating an electronic device according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made to example embodiments, which are illustrated in the accompanying drawings, wherein like reference numerals may refer to like components throughout.

FIG. 1 is a block diagram illustrating an electronic device according to some example embodiments.

Referring to FIG. 1, an electronic device 10 includes a secure module 100, an application processor 200, and a sensor 300.

The secure module 100 includes a processor 110 and a secure element (SE) 120.

The secure element 120 may store a first certificate CT1, which corresponds to the secure element 120 and is issued by a certificate authority (CA), a public key CA_PB of the certificate authority, and a first private key PR1 of the secure element 120. A first public key PB1 corresponding to the first private key PR1 may be included in the first certificate CT1.

In some example embodiments, the secure element 120 may be equipped with a function of defending itself against an attack, such as a lab attack, from outside. Therefore, the first certificate CT1, the public key CA_PB of the certificate authority, and the first private key PR1 may be securely stored in the secure element 120. The function of defending itself equipped in the secure element 120 may be implemented in various forms.

The processor 110 may be coupled to the secure element 120 through an internal bus INT_BUS.

The secure module 100, which includes the processor 110 and the secure element 120, may be formed in one chip or one package. For example, the processor 110 and the secure element 120 may be provided as one package through system in package (SIP), through silicon via (TSV), multi-chip package (MCP), package on package (POP), etc.

The processor 110 may be directly coupled to the application processor 200 through an external bus EXT_BUS connected to an external electrode of the one package, which corresponds to the secure module 100.

The application processor 200 may store the public key CA_PB of the certificate authority, a second certificate CT2, which corresponds to the application processor 200 and is issued by the certificate authority, and a second private key PR2 of the application processor 200. A second public key PB2 corresponding to the second private key PR2 may be included in the second certificate CT2.

As described above, since the secure module 100, which includes the processor 110 and the secure element 120, is formed in one chip or one package, the internal bus INT_BUS connecting the processor 110 and the secure element 120 may be formed in the one chip or the one package such that the internal bus INT_BUS may not be exposed to outside of the one package. Therefore, the processor 110 and the secure element 120 may securely communicate data with each other without establishing a secure channel between the processor 110 and the secure element 120. As such, a communication overhead of the electronic device 10 may be effectively reduced.

In some example embodiments, the processor 110 may operate in one of a normal mode and a bypass mode.

In the bypass mode, the processor 110 may activate a bypass channel BP_CH connecting the application processor 200 and the secure element 120. Therefore, in the bypass mode, the processor 110 may bypass a signal received from the application processor 200 to the secure element 120 through the bypass channel BP_CH, and may bypass a signal received from the secure element 120 to the application processor 200 through the bypass channel BP_CH.

In the normal mode, the processor 110 may deactivate the bypass channel BP_CH, and may communicate with the application processor 200 directly.

The sensor 300 may generate sensing data SSD, and provide the sensing data SSD to the processor 110.

In some example embodiments, the sensor 300 may be a bio sensor detecting biometric information. For example, the sensor 300 may detect a fingerprint, an iris pattern, a blood vessel pattern, a heart rate, a blood sugar, etc., may generate the sensing data SSD corresponding to the detected information, and may provide the sensing data SSD to the processor 110. However, example embodiments are not limited thereto, and the sensor 300 may be any kind of sensors, such as an illuminance sensor, an acoustic sensor, an acceleration sensor, image sensor, motion sensor, air pollution sensor, infrared sensor, ultra violet sensor, humidity sensor, etc.

Although the sensor 300 is illustrated to be connected to the processor 110 in FIG. 1, the sensor 300 may be connected to the application processor 200 according to some example embodiments. Here, the sensing data SSD may be transmitted through the external bus EXT_BUS.

Although the sensor 300 is illustrated to be outside of the secure module 100 in FIG. 1, the sensor 300 may be included in the secure module 100 according to some example embodiments. In this case, the processor 110, the secure element 120, and the sensor 300 may be formed in one package.

As will be described later, the secure module 100 may encrypt the sensing data SSD received from the sensor 300, and may provide the encrypted sensing data to the application processor 200, and the application processor 200 may acquire the sensing data SSD by decrypting the encrypted sensing data received from the secure module 100. Therefore, a security level of a data transfer in the electronic device 10 may increase.

FIG. 2 is a flowchart illustrating a method of data transfer in an electronic device according to some example embodiments.

The method of data transfer in an electronic device of FIG. 2 may be performed by the electronic device 10 of FIG. 1.

In FIG. 2, a method of securely transferring the sensing data SSD, which is generated by the sensor 300, from the secure module 100 to the application processor 200 is represented.

Hereinafter, the method of data transfer in the electronic device 10 will be described with reference to FIGS. 1 and 2.

Referring to FIG. 2, in the method of data transfer in the electronic device 10, the processor 110 may switch an operation mode from the normal mode to the bypass mode (step S100). In some example embodiments, the processor 110 may switch the operation mode from the normal mode to the bypass mode in response to a request from the application processor 200.

FIG. 3 is a flowchart illustrating an example of a process of switching an operation mode of a processor to a bypass mode of FIG. 2.

Referring to FIG. 3, the application processor 200 may transmit a bypass request signal to the processor 110 (step S110).

The processor 110 may activate the bypass channel BP_CH, connecting the application processor 200 and the secure element 120, in response to the bypass request signal received from the application processor 200 (step S120). Therefore, the processor 110 may bypass a signal received from the application processor 200 to the secure element 120 through the bypass channel BP_CH, and may bypass a signal received from the secure element 120 to the application processor 200 through the bypass channel BP_CH.

FIG. 4 is a flowchart illustrating another example of a process of switching an operation mode of a processor to a bypass mode of FIG. 2.

Referring to FIG. 4, the application processor 200 may transmit a bypass request signal and a serial number of the application processor 200 to the processor 110 (step S130).

The processor 110 may include a serial number table, which stores serial numbers of devices that are allowed to communicate with the processor 110. The processor 110 may determine whether the serial number of the application processor 200 is stored in the serial number table in response to the bypass request signal received from the application processor 200 (step S140).

When the serial number of the application processor 200 is stored in the serial number table (step S140; yes), the processor 110 may activate the bypass channel BP_CH connecting the application processor 200 and the secure element 120 (step S150). Therefore, the processor 110 may bypass a signal received from the application processor 200 to the secure element 120 through the bypass channel BP_CH, and may bypass a signal received from the secure element 120 to the application processor 200 through the bypass channel BP_CH.

When the serial number of the application processor 200 is not stored in the serial number table (step S140; no), the processor 110 may maintain the operation mode in the normal mode to deactivate the bypass channel BP_CH, and may terminate the communication with the application processor 200.

Referring again to FIG. 2, the application processor 200 and the secure element 120 may perform a cross-authentication (step S200). In some example embodiments, the application processor 200 and the secure element 120 may perform the cross-authentication using the first certificate CT1, the second certificate CT2, and the public key CA_PB of the certificate authority.

Figure 5B:
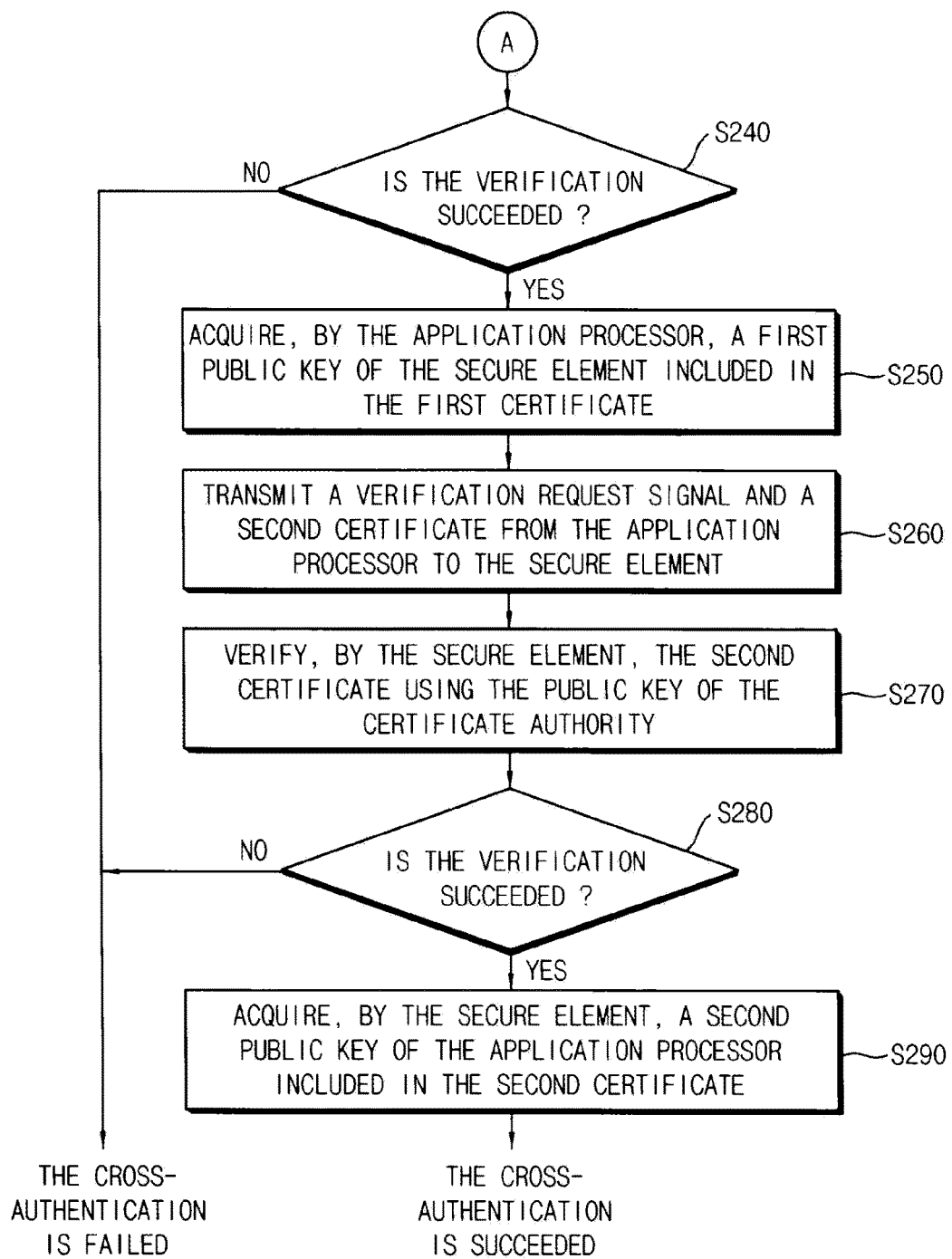

FIGS. 5A and 5B are flowchart illustrating an example of a process of performing a cross-authentication, by the application processor and the secure element, of FIG. 2.

Referring to FIGS. 5A and 5B, the application processor 200 may transmit a certificate request signal to the secure element 120 (step S210).

The secure element 120 may transmit the first certificate CT1, which is stored in the secure element 120, to the application processor 200 in response to the certificate request signal (step S220).

The application processor 200 may verify the first certificate CT1 using the public key CA_PB of the certificate authority, which is stored in the application processor 200 (step S230), and may determine whether the verification is succeeded (step S240).

If the first certificate CT1, which is stored in the secure element 120, and the second certificate CT2, which is stored in the application processor 200, are issued by different certificate authorities from each other, the verification of the first certificate CT1 may be failed. When the verification is failed (step S240; no), the application processor 200 may determine that the cross-authentication is failed, and may terminate the communication with the secure element 120.

If the first certificate CT1, which is stored in the secure element 120, and the second certificate CT2, which is stored in the application processor 200, are issued by the same certificate authority, the verification may be succeeded. When the verification is succeeded (step S240; yes), the application processor 200 may acquire the first public key PB1 of the secure element 120 included in the first certificate CT1 (step S250).

After that, the application processor 200 may transmit a verification request signal and the second certificate CT2, which is stored in the application processor 200, to the secure element 120 (step S260).

The secure element 120 may verify the second certificate CT2 using the public key CA_PB of the certificate authority, which is stored in the secure element 120, in response to the verification request signal (step S270), and may determine whether the verification is succeeded (step S280).

If the first certificate CT1, which is stored in the secure element 120, and the second certificate CT2, which is stored in the application processor 200, are issued by different certificate authorities from each other, the verification of the second certificate CT2 may be failed. When the verification is failed (step S280; no), the secure element 120 may determine that the cross-authentication is failed, and may terminate the communication with the application processor 200.

If the first certificate CT1, which is stored in the secure element 120, and the second certificate CT2, which is stored in the application processor 200, are issued by the same certificate authority, the verification may be succeeded. When the verification is succeeded step S280; yes), the secure element 120 may acquire the second public key PB2 of the application processor 200 included in the second certificate CT2 (step S290). In this case, it is determined that the cross-authentication is succeeded.

As described above with reference to FIGS. 5A and 5B, when the cross-authentication is succeeded, the application processor 200 may acquire the first public key PB1 of the secure element 120, and the secure element 120 may acquire the second public key PB2 of the application processor 200.

Referring again to FIG. 2, when the cross-authentication is failed (step S300; no), the communication between the application processor 200 and the secure element 120 may be terminated.

When the cross-authentication is succeeded (step S300; yes), the application processor 200 and the secure element 120 generate a session key (step S400). As will be described later, the session key may be used in encrypting the sensing data SSD generated by the sensor 300 and decrypting the encrypted sensing data SSD. In some example embodiments, the application processor 200 and the secure element 120 may generate the session key using the first private key PR1 and the second private key PR2.

Figure 6B:
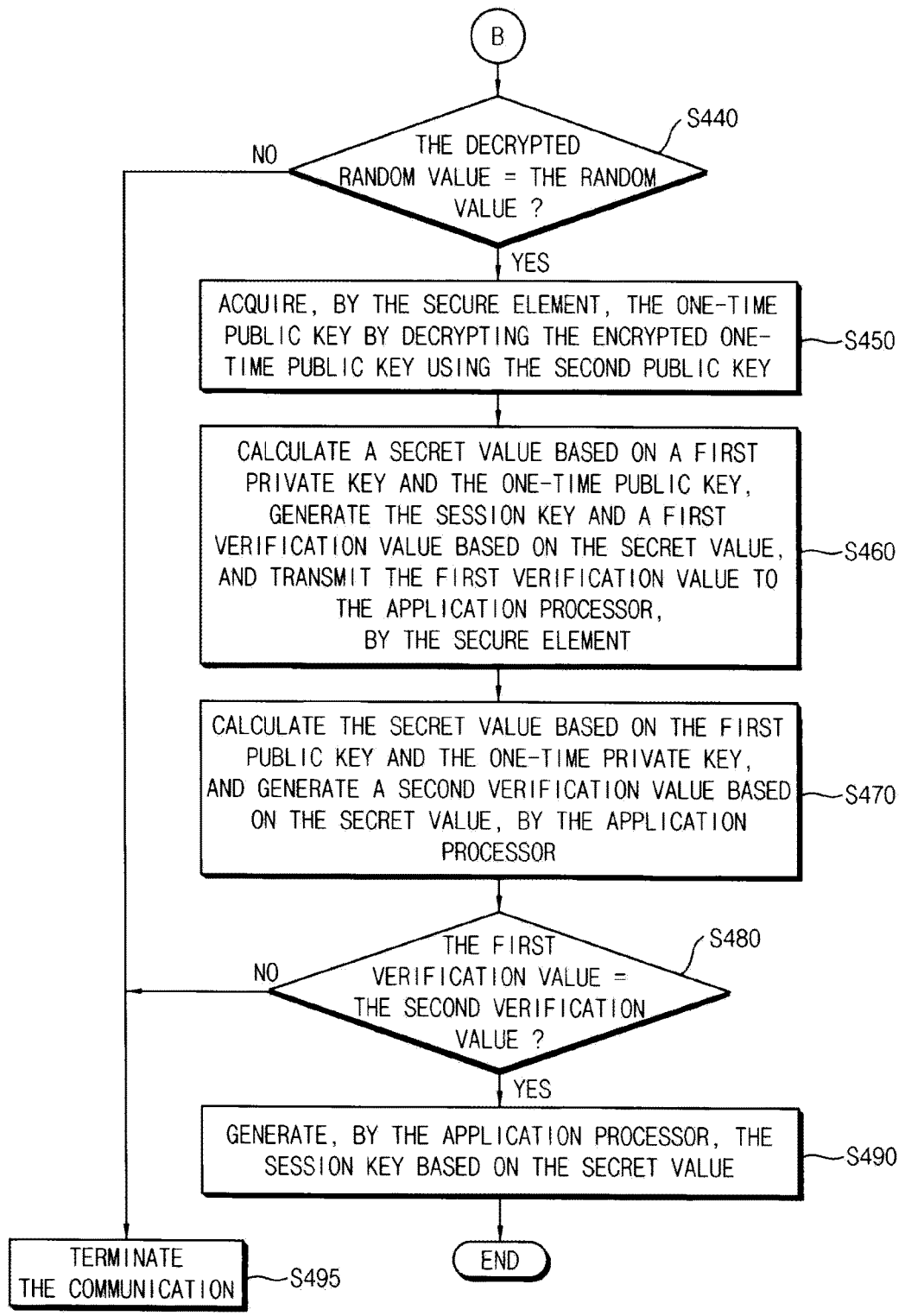

FIGS. 6A and 6B are flowchart illustrating an example of a process of generating a session key, by the application processor and the secure element, of FIG. 2.

Referring to FIGS. 6A and 6B, the secure element 120 may generate a random value and transmit the random value to the application processor 200 (step S410).

When the application processor 200 receives the random value from the secure element 120, the application processor 200 may generate a pair of a one-time private key and a one-time public key, may encrypt the random value and the one-time public key using the second private key PR2, which is stored in the application processor 200, and may transmit the encrypted random value and the encrypted one-time public key to the secure element 120 (step S420).

The secure element 120 may decrypt the encrypted random value using the second public key PB2 of the application processor 200, which is acquired while performing the cross-authentication (step S430).

After that, the secure element 120 may determine whether the decrypted random value is identical to the random value, which is initially generated by the secure element 120 (step S440).

When the decrypted random value is not identical to the random value (step S440; no), the secure element 120 may terminate the communication with the application processor 200 (step S495).

When the decrypted random value is identical to the random value (step S440; yes), the secure element 120 may acquire the one-time public key by decrypting the encrypted one-time public key using the second public key PB2 of the application processor 200, which is acquired while performing the cross-authentication (step S450).

After that, the secure element 120 may calculate a secret value based on the first private key PR1, which is stored in the secure element 120, and the one-time public key, may generate the session key and a first verification value based on the secret value, and may transmit the first verification value to the application processor 200 (step S460).

In some example embodiments, a first algorithm, by which the secret value is calculated based on the first private key PR1 and the one-time public key, and a second algorithm, by which the session key and the first verification value are generated based on the secret value, may or may not be predefined between the secure element 120 and the application processor 200. Such first and second algorithms are known to those skilled in the art.

When the application processor 200 receives the first verification value from the secure element 120, the application processor 200 may calculate the secret value based on the first public key PB1 of the secure element 120, which is acquired while performing the cross-authentication, and the one-time private key, and may generate a second verification value based on the secret value (step S470).

In some example embodiments, the application processor 200 may calculate the secret value and the second verification value using the first algorithm and the second algorithm, respectively, which may or may not be predefined between the secure element 120 and the application processor 200.

After that, the application processor 200 may determine whether the second verification value is identical to the first verification value received from the secure element 120 (step S480).

When the second verification value is not identical to the first verification value (step S480; no), the application processor 200 may terminate the communication with the secure element 120 (step S495).

When the second verification value is identical to the first verification value (step S480; yes), the application processor 200 may generate the session key based on the secret value (step S490).

In some example embodiments, the application processor 200 may generate the session key using the second algorithm, which may or may not be predefined between the secure element 120 and the application processor 200.

Therefore, the session key generated by the secure element 120 may be the same as the session key generated by the application processor 200.

Each of the secure element 120 and the application processor 200 may store the session key internally.

Referring again to FIG. 2, after the application processor 200 and the secure element 120 generate the session key, the processor 110 may switch the operation mode from the bypass mode to the normal mode (step S500). In some example embodiments, the processor 110 may switch the operation mode from the bypass mode to the normal mode in response to a request from the application processor 200.

After that, the secure module 100 receives the sensing data SSD from the sensor 300, and encrypts the sensing data SSD using the session key stored in the secure element 120 (step S600).

In some example embodiments, the processor 110 may include a hardware encryption engine. In this case, the processor 110 may encrypt the sensing data SSD using the hardware encryption engine.

In some example embodiments, the processor 110 may not include a hardware encryption engine. In this case, the secure element 120 may encrypt the sensing data SSD.

FIG. 7 is a flowchart illustrating an example of a process of encrypting, by a secure module, sensing data provided by a sensor using the session key of FIG. 2.

In FIG. 7, an operation of the electronic device 10 is represented when the processor 110 includes the hardware encryption engine.

Referring to FIG. 7, the processor 110 may receive the sensing data SSD from the sensor 300 (step S610). When the sensor 300 is a bio sensor, the sensing data SSD may include biometric information such as a fingerprint, an iris pattern, a blood vessel pattern, a heart rate, a blood sugar, etc.

The processor 110 may transmit a session key request signal to the secure element 120 (step S620).

The secure element 120 may transmit the session key, which is stored in the secure element 120, to the processor 110 in response to the session key request signal (step S630).

As described above with reference to FIG. 1, since the secure module 100, which includes the processor 110 and the secure element 120, is formed in one package, the internal bus INT_BUS connecting the processor 110 and the secure element 120 may be formed in the one package such that the internal bus INT_BUS may not be exposed to outside of the one package. Therefore, the secure element 120 may securely transmit the session key to the processor 110 without establishing a secure channel between the processor 110 and the secure element 120. As such, a communication overhead of the electronic device 10 may be effectively reduced.

The processor 110 may encrypt the sensing data SSD using the session key received from the secure element 120 (step S640).

Figure 8:
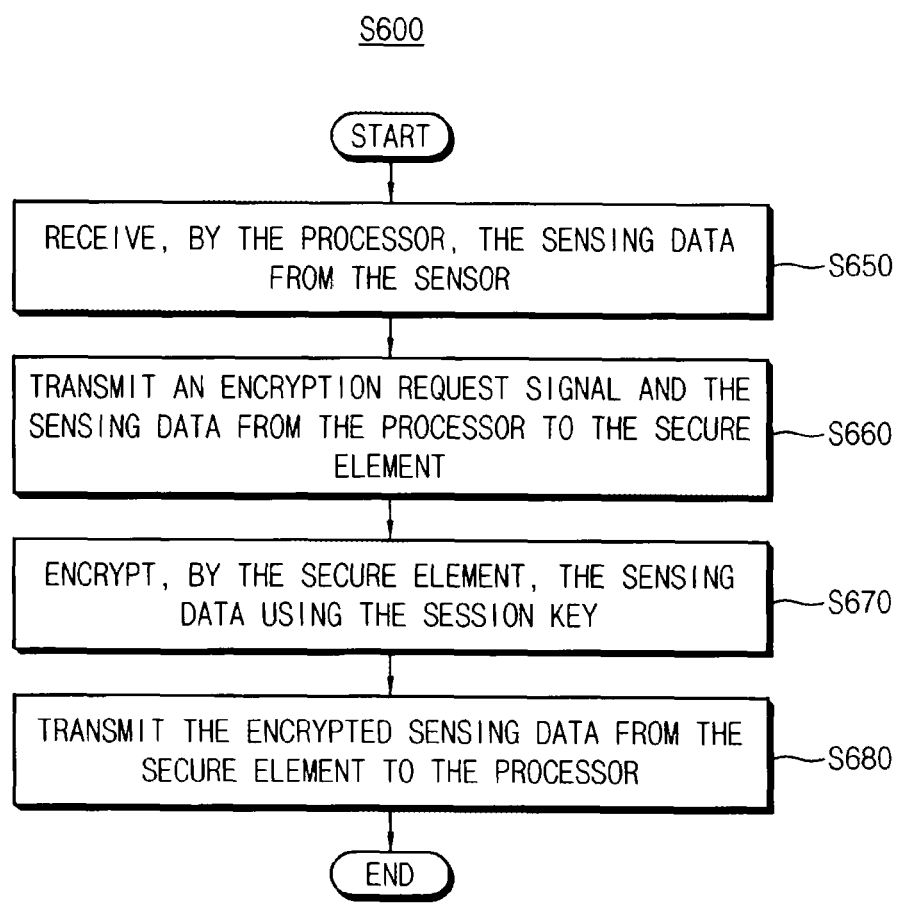
FIG. 8 is a flowchart illustrating another example of a process of encrypting, by a secure module, sensing data provided by a sensor using the session key of FIG. 2.

FIG. 8 is a flowchart illustrating another example of a process of encrypting, by a secure module, sensing data provided by a sensor using the session key of FIG. 2.

In FIG. 8, an operation of the electronic device 10 is represented when the processor 110 does not include the hardware encryption engine.

Referring to FIG. 8, the processor 110 may receive the sensing data SSD from the sensor 300 (step S650). When the sensor 300 is a bio sensor, the sensing data SSD may include biometric information such as a fingerprint, an iris pattern, a blood vessel pattern, a heart rate, a blood sugar, etc.

The processor 110 may transmit an encryption request signal and the sensing data SSD to the secure element 120 (step S660).

The secure element 120 may encrypt the sensing data SSD using the session key, which is stored in the secure element 120, in response to the encryption request signal (step S670).

After that, the secure element 120 may transmit the encrypted sensing data to the processor 110 (step S680).

Referring again to FIG. 2, the processor 110 may transfer the encrypted sensing data to the application processor 200 (step S700).

As described above with reference to FIG. 1, since the processor 110 is directly coupled to the application processor 200 through the external bus EXT_BUS connected to an external electrode of the one package, which corresponds to the secure module 100, the processor 110 may transfer the encrypted sensing data to the application processor 200 through the external bus EXT_BUS. Since the encrypted sensing data is generated by encrypting the sensing data SSD using the session key, the sensing data SSD may be effectively prevented from being leaked although the external bus EXT_BUS is probed by a scope.

The application processor 200 acquires the sensing data SSD by decrypting the encrypted sensing data using the session key, which is stored in the application processor 200 (step S800).

As described above with reference to FIGS. 1 to 8, in the electronic device 10 according to some example embodiments, the secure module 100, which includes the processor 110 and the secure element 120, may be formed in one chip or one package. While the processor 110 operates in the bypass mode, the application processor 200 and the secure element 120 may perform the cross-authentication using the first certificate CT1, which is stored in the secure element 120, the second certificate CT2, which is stored in the application processor 200, and the public key CA_PB of the certificate authority, which is commonly stored in the secure element 120 and the application processor 200. When the cross-authentication is succeeded, the application processor 200 and the secure element 120 may generate the session key using the first private key PR1, which is stored in the secure element 120, and the second private key PR2, which is stored in the application processor 200. After that, the secure module 100 may encrypt the sensing data SSD using the session key and transfer the encrypted sensing data to the application processor 200, and the application processor 200 may acquire the sensing data SSD by decrypting the encrypted sensing data using the session key. Therefore, a security level of a data transfer in the electronic device 10 may increase.

In some example embodiments, the application processor 200 may be implemented with another secure module having the same or similar structure as the secure module 100. In this case, secure modules included in the electronic device 10 may communicate data with each other securely by an operation described above with reference to FIGS. 1 to 8.

The methods of data transfer in the electronic device 10 according to some example embodiments are described above with reference to FIGS. 1 to 8 when the secure module 100 and the application processor 200 are included in the same electronic device. However, example embodiments are not limited thereto. The method of data transfer according to some example embodiments may be used when the secure module 100 and the application processor 200 are included in different electronic devices from each other.

Figure 9:
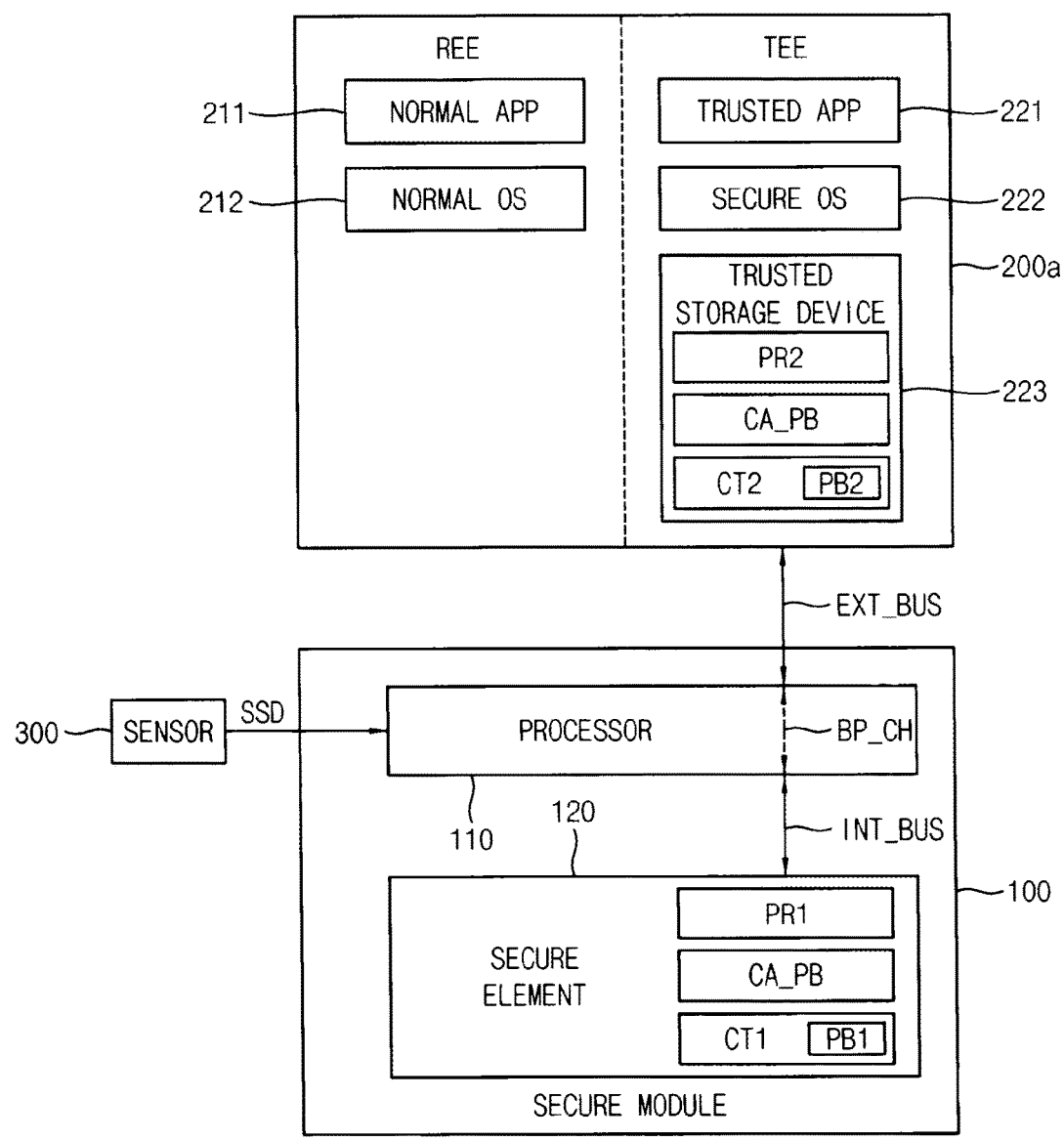
FIG. 9 is a block diagram illustrating an example of an electronic device of FIG. 1.

FIG. 9 is a block diagram illustrating an example of an electronic device of FIG. 1.

Referring to FIG. 9, an electronic device 10a may include a secure module 100, an application processor 200a, and a sensor 300.

The secure module 100 and the sensor 300 included in the electronic device 10a of FIG. 9 may be the same as the secure module 100 and the sensor 300 included in the electronic device 10 of FIG. 1. Since a structure and an operation of the secure module 100 and the sensor 300 included in the electronic device 10 of FIG. 1 are described above with reference to FIGS. 1 to 8, detailed description about the secure module 100 and the sensor 300 included in the electronic device 10a of FIG. 9 will be omitted here.

The application processor 200a may include a trusted execution environment (TEE) and a rich operating system execution environment (REE). For example, the trusted execution environment (TEE) may be implemented with a TrustZone® by ARM®.

In the rich operating system execution environment (REE), a normal application 211 may operate on a normal operating system 212 such as Android®. In the trusted execution environment (TEE), a desired trusted application 221 (that may or may not be predetermined), which communicates with the secure module 100, may operate on a secure operating system 222.

In addition, the application processor 200a may include a trusted storage device 223 operating on the trusted execution environment (TEE). For example, the trusted storage device 223 may be an electrically erasable programmable read-only memory (EEPROM), a flash memory, a phase-change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The public key CA_PB of the certificate authority, the second certificate CT2, which corresponds to the application processor 200a and is issued by the certificate authority, and the second private key PR2 of the application processor 200a may be stored in the trusted storage device 223.

Since the trusted storage device 223 operates on the trusted execution environment (TEE), the trusted storage device 223 may be accessed by only the desired trusted application 221 (that may or may not be predetermined) operating on the trusted execution environment (TEE). That is, the normal application 211 operating on the rich operating system execution environment (REE) may not be able to access the trusted storage device 223.

Therefore, the desired trusted application 221 (that may or may not be predetermined) may securely acquire the sensing data SSD from the secure module 100 by performing operations described above with reference to FIGS. 1 to 8 using the public key CA_PB of the certificate authority, the second certificate CT2, and the second private key PR2 stored in the trusted storage device 223.

As described above with reference to FIG. 9, the application processor 200a may acquire the sensing data SSD from the secure module 100 by communicating with the secure module 100 through the trusted execution environment (TEE). Therefore, a security level of a data transfer in the electronic device 10a may further increase.

Figure 10:
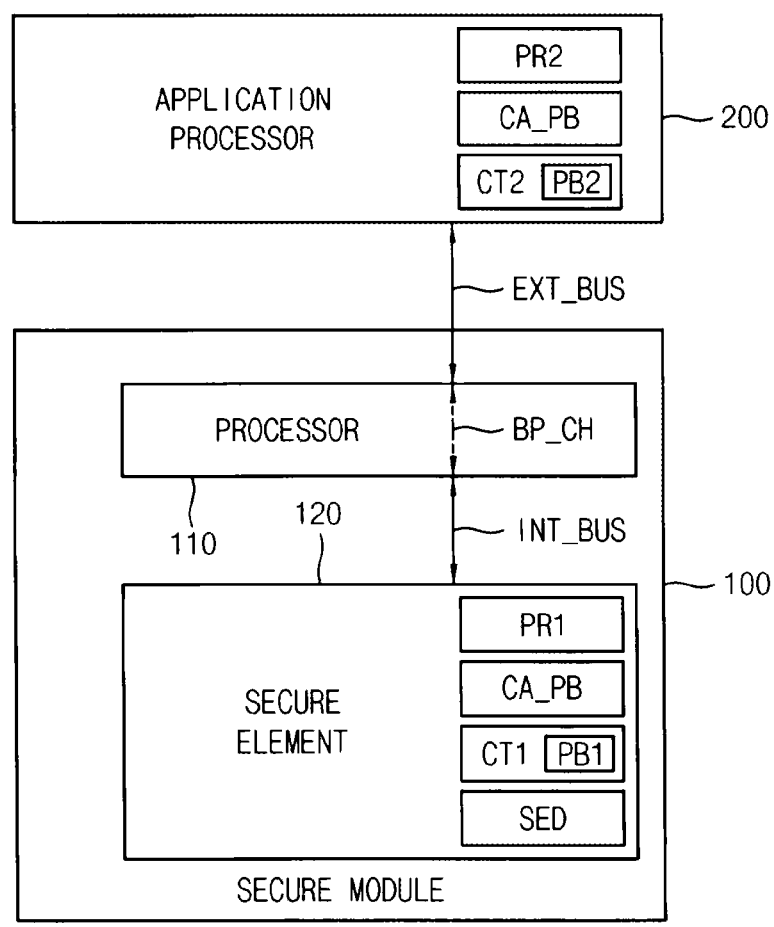
FIG. 10 is a block diagram illustrating an electronic device according to some example embodiments.

FIG. 10 is a block diagram illustrating an electronic device according to some example embodiments.

Referring to FIG. 10, an electronic device 20 includes a secure module 100 and an application processor 200.

The secure module 100 and the application processor 200 included in the electronic device 20 of FIG. 10 may be the same as the secure module 100 and the application processor 200 included in the electronic device 10 of FIG. 1, except that the secure element 120 included in the electronic device 20 of FIG. 10 further stores security data SED. Since a structure and an operation of the secure module 100 and the application processor 200 included in the electronic device 10 of FIG. 1 are described above with reference to FIGS. 1 to 9, detailed description about the secure module 100 and the application processor 200 included in the electronic device 20 of FIG. 10 will be omitted here.

Figure 11:
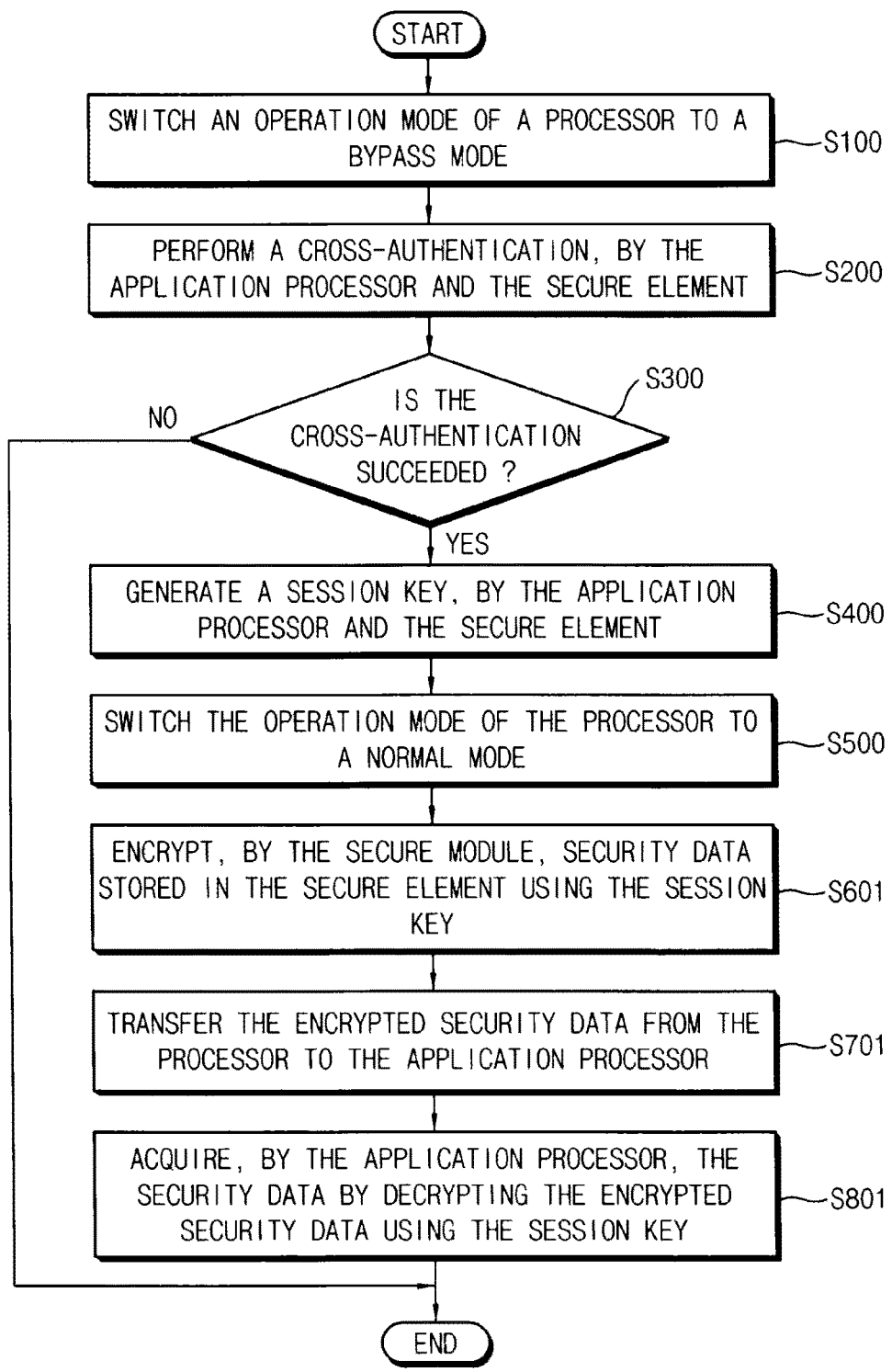
FIG. 11 is a flowchart illustrating a method of data transfer in an electronic device according to some example embodiments.

FIG. 11 is a flowchart illustrating a method of data transfer in an electronic device according to some example embodiments.

The method of data transfer in an electronic device of FIG. 11 may be performed by the electronic device 20 of FIG. 10.

In FIG. 11, a method of securely transferring the security data SED, which is stored in the secure element 120, from the secure module 100 to the application processor 200 is represented.

Hereinafter, the method of data transfer in the electronic device 20 will be described with reference to FIGS. 10 and 11.

Referring to FIG. 11, in the method of data transfer in the electronic device 20, the processor 110 switches an operation mode from the normal mode to the bypass mode (step S100).

The application processor 200 and the secure element 120 perform a cross-authentication (step S200).

When the cross-authentication is failed (step S300; no), the communication between the application processor 200 and the secure element 120 may be terminated.

When the cross-authentication is succeeded (step S300; yes), the application processor 200 and the secure element 120 generate a session key (step S400).

After the application processor 200 and the secure element 120 generate the session key, the processor 110 switches the operation mode from the bypass mode to the normal mode (step S500).

The steps S100, S200, S300, S400 and S500 of FIG. 11 may be performed in the same way as the steps S100, S200, S300, S400 and S500 of FIG. 2. Since operations of the steps S100, S200, S300, S400 and S500 of FIG. 2 are described above with reference to FIGS. 1 to 8, detailed description about the steps S100, S200, S300, S400 and S500 of FIG. 11 will be omitted here.

After that, the secure module 100 encrypts the security data SED, which is stored in the secure element 120, using the session key, which is stored in the secure element 120 (step S601).

In some example embodiments, the processor 110 may include a hardware encryption engine. In this case, the processor 110 may encrypt the security data SED using the hardware encryption engine.

In some example embodiments, the processor 110 may not include a hardware encryption engine. In this case, the secure element 120 may encrypt the security data SED.

Figure 12:
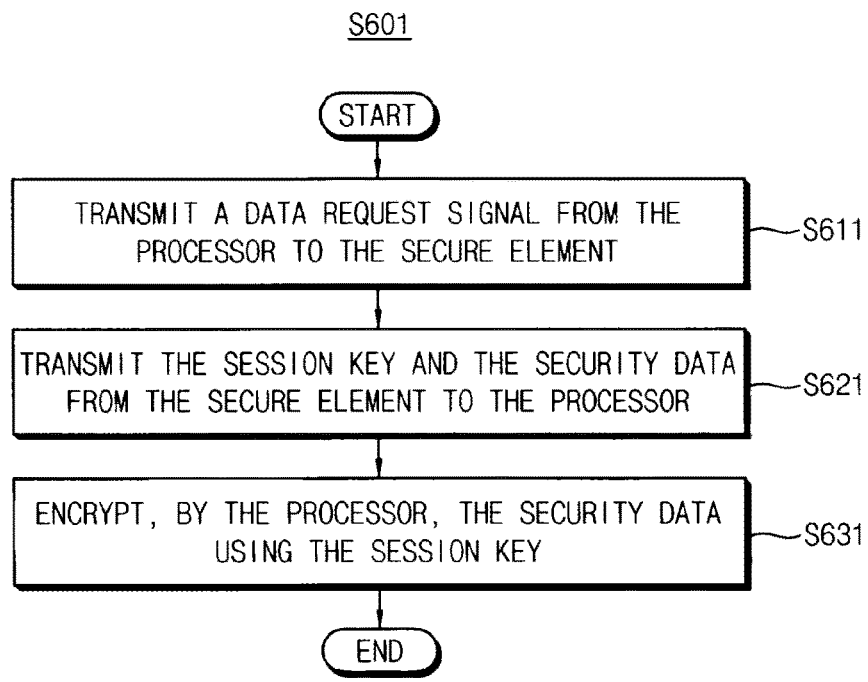
FIG. 12 is a flowchart illustrating an example of a process of encrypting, by a secure module, security data stored in the secure element using the session key of FIG. 2.

FIG. 12 is a flowchart illustrating an example of a process of encrypting, by a secure module, security data stored in the secure element using the session key of FIG. 11.

In FIG. 12, an operation of the electronic device 20 is represented when the processor 110 includes the hardware encryption engine.

Referring to FIG. 12, the processor 110 may transmit a data request signal to the secure element 120 (step S611).

The secure element 120 may transmit the session key and the security data SED, which are stored in the secure element 120, to the processor 110 in response to the data request signal (step S621).

As described above with reference to FIG. 1, since the secure module 100, which includes the processor 110 and the secure element 120, is formed in one package, the internal bus INT_BUS connecting the processor 110 and the secure element 120 may be formed in the one package such that the internal bus INT_BUS may not be exposed to outside of the one package. Therefore, the secure element 120 may securely transmit the session key and the security data SED to the processor 110 without establishing a secure channel between the processor 110 and the secure element 120. As such, a communication overhead of the electronic device 20 may be effectively reduced.

The processor 110 may encrypt the security data SED using the session key received from the secure element 120 (step S631).

Figure 13:
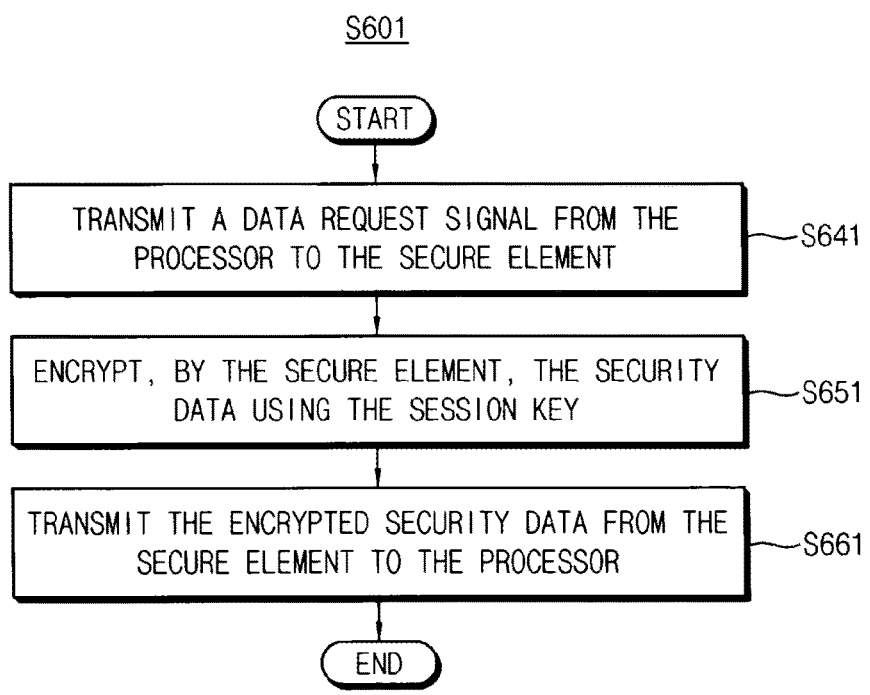
FIG. 13 is a flowchart illustrating another example of a process of encrypting, by a secure module, security data stored in the secure element using the session key of FIG. 2.

FIG. 13 is a flowchart illustrating another example of a process of encrypting, by a secure module, security data stored in the secure element using the session key of FIG. 2.

In FIG. 13, an operation of the electronic device 20 is represented when the processor 110 does not include the hardware encryption engine.

Referring to FIG. 13, the processor 110 may transmit a data request signal to the secure element 120 (step S641).

The secure element 120 may encrypt the security data SED using the session key, which is stored in the secure element 120, in response to the data request signal (step S651).

After that, the secure element 120 may transmit the encrypted security data to the processor 110 (step S661).

Referring again to FIG. 11, the processor 110 may transfer the encrypted security data to the application processor 200 (step S701).

As described above with reference to FIG. 1, since the processor 110 is directly coupled to the application processor 200 through the external bus EXT_BUS connected to an external electrode of the one package, which corresponds to the secure module 100, the processor 110 may transfer the encrypted security data to the application processor 200 through the external bus EXT_BUS. Since the encrypted security data is generated by encrypting the security data SED using the session key, the security data SED may be effectively prevented from being leaked although the external bus EXT_BUS is probed by a scope.

The application processor 200 may acquire the security data SED by decrypting the encrypted security data using the session key, which is stored in the application processor 200 (step S801).

As described above with reference to FIGS. 10 to 13, the electronic device 20 according to some example embodiments may securely transfer the security data SED, which is stored in the secure element 120, to the application processor 200. Therefore, a security level of a data transfer in the electronic device 20 may increase.

Figure 14:
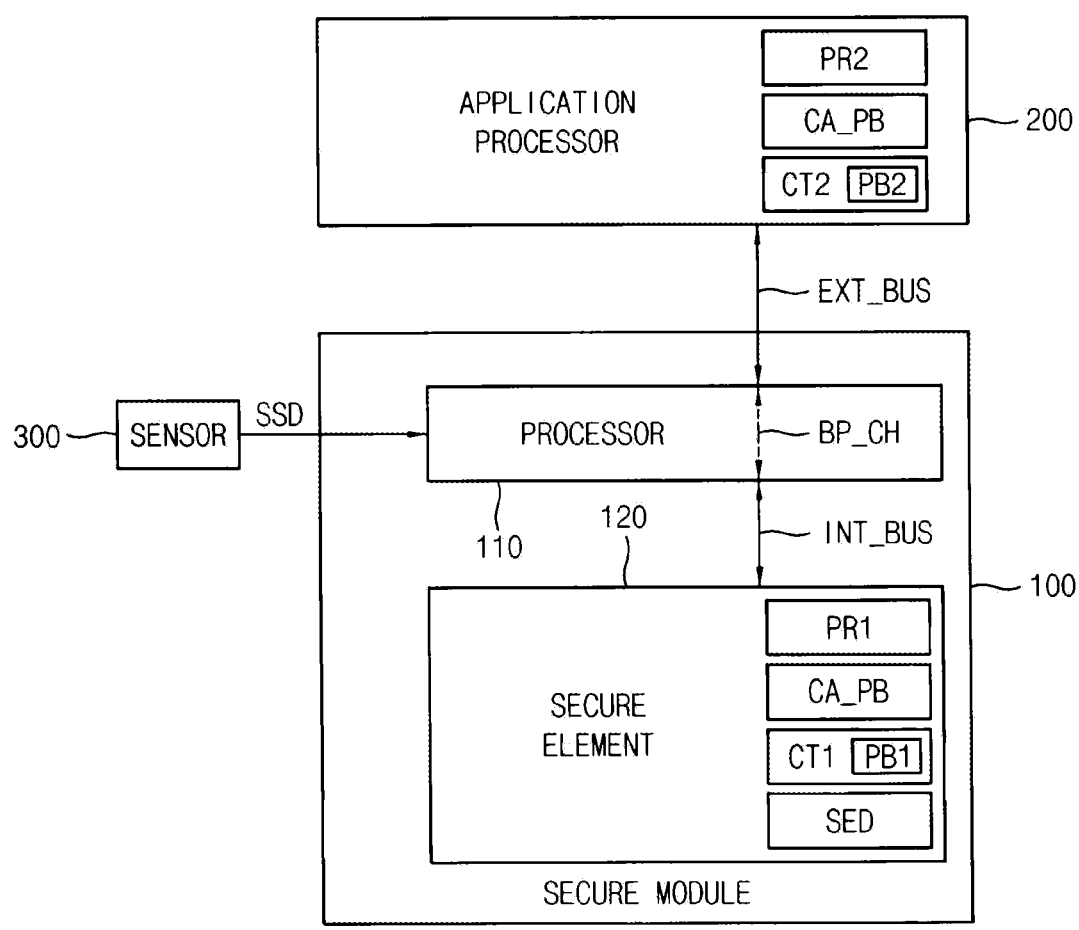
FIG. 14 is a block diagram illustrating an electronic device according to some example embodiments.

FIG. 14 is a block diagram illustrating an electronic device according to some example embodiments.

Referring to FIG. 14, an electronic device 30 includes a secure module 100, an application processor 200, and a sensor 300.

The electronic device 30 of FIG. 14 may be the same as the electronic device 10 of FIG. 1, except that the secure element 120 included in the electronic device 30 of FIG. 14 further stores security data SED. That is, the electronic device 30 of FIG. 14 may correspond to a combination of the electronic device 10 of FIG. 1 and the electronic device 20 of FIG. 10.

Therefore, the electronic device 30 may perform both of the method of securely transferring the sensing data SSD, which is generated by the sensor 300, from the secure module 100 to the application processor 200 described above with reference to FIGS. 1 to 9, and the method of securely transferring the security data SED, which is stored in the secure element 120, from the secure module 100 to the application processor 200 described above with reference to FIGS. 10 to 13.

Since structures and operations of the electronic device 10 of FIG. 1 and the electronic device 20 of FIG. 10 are described above with reference to FIGS. 1 to 13, detailed description about the electronic device 30 of FIG. 14 will be omitted here.

Figure 15:
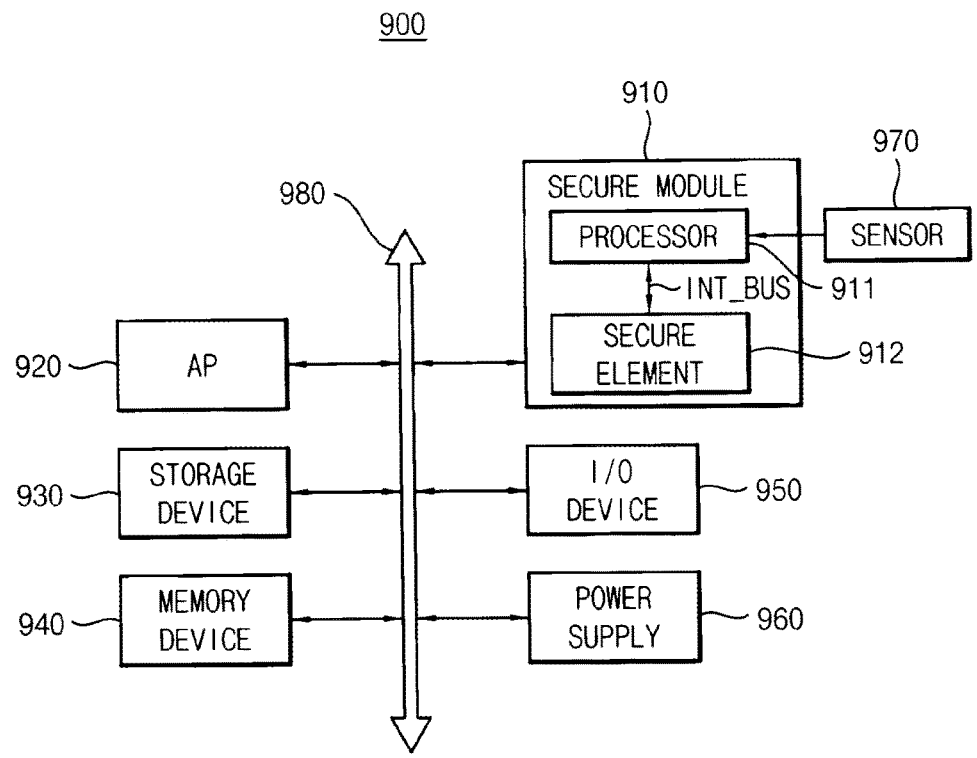
FIG. 15 is a block diagram illustrating an electronic system according to some example embodiments.

FIG. 15 is a block diagram illustrating an electronic system according to some example embodiments.

Referring to FIG. 15, an electronic system 900 includes a secure module 910, an application processor (AP) 920, a storage device 930, a memory device 940, an input/output (I/O) device 950, a power supply 960, a sensor 970, and, optionally, an external bus 980. Although it is not illustrated in FIG. 15, the electronic system 900 may further include ports that communicate with a video card, a sound card, a memory card, a universal serial bus (USB) device, or other electronic devices.

The application processor 920 controls overall operations of the electronic system 900. The application processor 920 may execute applications, such as a web browser, a game application, a video player, etc. In some example embodiments, the application processor 920 may include a single core or multiple cores. For example, the application processor 920 may be a multi-core processor, such as a dual-core processor, a quad-core processor, a hexa-core processor, etc. The application processor 920 may include an internal or external cache memory.

The secure module 910 includes a processor 911 and a secure element 912. The secure module 910, which includes the processor 911 and the secure element 912, may be formed in one package, and an internal bus INT_BUS connecting the processor 911 and the secure element 912 may be formed in the one package such that the internal bus INT_BUS may not be exposed to outside of the one package. The secure element 912 may be equipped with a function of defending itself against an attack, such as a lab attack, from outside. Therefore, the secure element 912 may store security data securely. The processor 911 may be coupled to the application processor 920.

The sensor 970 may be a bio sensor detecting biometric information. For example, the sensor 970 may detect a fingerprint, an iris pattern, a blood vessel pattern, a heart rate, a blood sugar, etc., may generate sensing data corresponding to the detected information, and may provide the sensing data to the processor 911 included in the secure module 910. However, example embodiments are not limited thereto, and the sensor 970 may be any kind of sensors, such as an illuminance sensor, an acoustic sensor, an acceleration sensor, etc.

The secure module 910, the application processor 920, and the sensor 970 included in the electronic system 900 of FIG. 15 may be implemented with the secure module 100, the application processor 200, and the sensor 300 included in the electronic device 30 of FIG. 14. Since a structure and an operation of the secure module 100, the application processor 200, and the sensor 300 included in the electronic device 30 of FIG. 14 are described above with reference to FIGS. 1 to 14, detailed description about the secure module 910, the application processor 920, and the sensor 970 will be omitted here.

The storage device 930 may store a boot image for booting the electronic system 900. For example, the storage device 930 may include a nonvolatile memory device, such as a flash memory device, a solid state drive (SSD), etc.

The memory device 940 may store data required for an operation of the electronic system 900. For example, the memory device 940 may include a volatile memory device such as a dynamic random access memory (DRAM), a static random access memory (SRAM), etc.

The input/output device 950 may include an input device such as a touch screen, a keypad, etc., and an output device such as a speaker, a display device, etc. The power supply 960 may supply operational power to the electronic system 900.

In some example embodiments, the electronic system 900 may be an arbitrary mobile system, such as a mobile phone, a smart phone, a personal digital assistant (PDA), a portable multimedia player (PMP), a digital camera, a camcorder, a music player, a portable game console, a navigation system, a laptop computer, etc.

Figure 16:
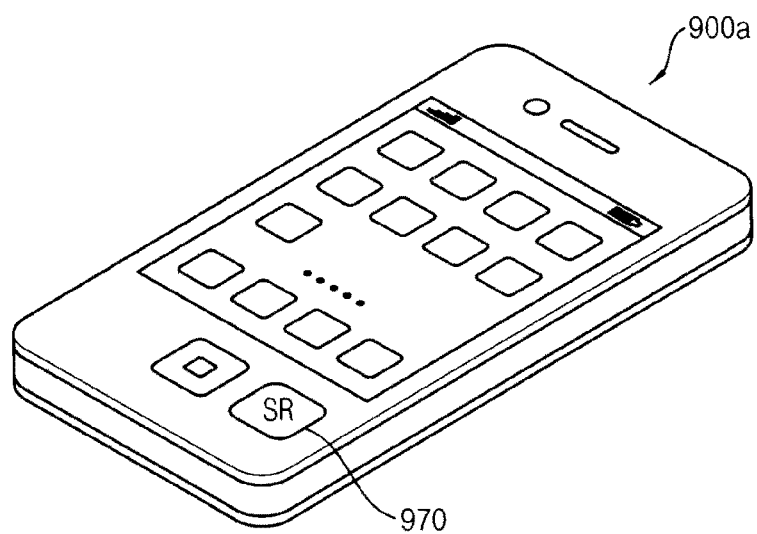
FIG. 16 is a diagram illustrating an example in which the electronic system of FIG. 15 is implemented as a smart phone.

FIG. 16 is a diagram illustrating an example in which the electronic system of FIG. 15 is implemented as a smart phone.

Referring to FIGS. 15 and 16, the secure element 912 included in a smart phone 900a may store security data corresponding to biometric information of a user.

For example, if the sensor 970 included in the smart phone 900a is a fingerprint sensor, the security data stored in the secure element 912 may correspond to a fingerprint of the user.

The smart phone 900a may determine whether a current user of the smart phone 900a is an allowed user of the smart phone 900a. For example, the secure module 910, the application processor 920, and the sensor 970 included in the smart phone 900a may perform operations described above with reference to FIGS. 1 to 8 such that sensing data, which is generated by the sensor 970, corresponding to a fingerprint of a current user may be securely transferred to the application processor 920 through the secure module 910. In addition, the secure module 910 and the application processor 920 may perform operations described above with reference to FIGS. 10 to 13 such that the security data, which is stored in the secure element 912, may be securely transferred to the application processor 920. The application processor 920 may determine whether the current user is an allowed user of the smart phone 900a based on whether the sensing data is identical to the security data.

The user authentication process using a fingerprint described above with reference to FIG. 16 is one of applications of the method of data transfer in the electronic device according to some example embodiments. The method of data transfer in the electronic device according to some example embodiments may be applied in various ways.

Algorithms for implementation or control of the data transfer technologies discussed in this application may be used for implementation or control of more general purpose apparatuses and/or methods of controlling apparatuses.

Methods for implementation or control of the data transfer technologies discussed in this application may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiments, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A method of data transfer in an electronic device including a secure module, which includes a processor, a secure element, an application processor, and a sensor, comprising:
   switching an operation mode of the processor to a bypass mode;
   performing a cross-authentication, by the application processor and the secure element using a public key and certificates;
   generating a session key, by the application processor and the secure element, when the cross-authentication is succeeded;
   switching the operation mode of the processor to a normal mode;
   encrypting, by the secure module, sensing data provided by the sensor using the session key;
   transferring the encrypted sensing data from the processor to the application processor; and
   acquiring, by the application processor, the sensing data by decrypting the encrypted sensing data using the session key.

2. The method of claim 1, wherein the secure module, which includes the processor and the secure element, is formed in one package.

3. The method of claim 2, wherein the processor is coupled to the application processor through an external electrode of the one package, and
   wherein the secure element is coupled to the processor through an internal bus formed in the one package.

4. The method of claim 3, wherein the processor is configured to communicate with the application processor in the normal mode,
   wherein the processor is further configured to bypass a signal received from the application processor to the secure element in the bypass mode, and
   wherein the processor is further configured to bypass a signal received from the secure element to the application processor in the bypass mode.

5. The method of claim 1, wherein the switching of the operation mode of the processor to the bypass mode includes:
   transmitting a bypass request signal from the application processor to the processor; and
   activating, by the processor, a bypass channel connecting the application processor and the secure element in response to the bypass request signal.

6. The method of claim 1, wherein the switching of the operation mode of the processor to the bypass mode includes:
   transmitting a bypass request signal and a serial number of the application processor from the application processor to the processor;
   determining, by the processor, whether the serial number of the application processor is stored in a serial number table in response to the bypass request signal; and
   activating, by the processor, a bypass channel connecting the application processor and the secure element when the serial number of the application processor is stored in the serial number table.

7. The method of claim 1, wherein the secure element is configured to store a first private key of the secure element, the public key of a certificate authority, and a first certificate corresponding to the secure element issued by the certificate authority,
   wherein the application processor is configured to store a second private key of the application processor, the public key of the certificate authority, and a second certificate corresponding to the application processor issued by the certificate authority, and
   wherein the certificates include the first certificate and second certificate.

8. The method of claim 7, wherein the performing of the cross-authentication, by the application processor and the secure element, includes:
   transmitting a certificate request signal from the application processor to the secure element;

transmitting the first certificate from the secure element to the application processor in response to the certificate request signal;
verifying, by the application processor, the first certificate using the public key of the certificate authority;
acquiring, by the application processor, a first public key of the secure element included in the first certificate when the verification of the first certificate is succeeded;
transmitting a verification request signal and the second certificate from the application processor to the secure element;
verifying, by the secure element, the second certificate using the public key of the certificate authority in response to the verification request signal; and
acquiring, by the secure element, a second public key of the application processor included in the second certificate when the verification of the second certificate is succeeded.

9. The method of claim 8, wherein the generating of the session key, by the application processor and the secure element, includes:
generating, by the secure element, a random value;
transmitting the random value from the secure element to the application processor;
generating, by the application processor, a pair of a one-time private key and a one-time public key;
encrypting, by the application processor, the random value and the one-time public key using the second private key;
transmitting the encrypted random value and the encrypted one-time public key from the application processor to the secure element;
decrypting, by the secure element, the encrypted random value using the second public key;
acquiring, by the secure element, the one-time public key by decrypting the encrypted one-time public key using the second public key when the decrypted random value is identical to the random value;
calculating, by the secure element, a secret value based on the first private key and the one-time public key;
generating, by the secure element, the session key and a first verification value based on the secret value;
transmitting the first verification value from the secure element to the application processor;
calculating, by the application processor, the secret value based on the first public key and the one-time private key;
generating, by the application processor, a second verification value based on the secret value; and
generating, by the application processor, the session key based on the secret value when the second verification value is identical to the first verification value.

10. The method of claim 1, wherein the encrypting, by the secure module, of the sensing data provided by the sensor using the session key includes:
receiving, by the processor, the sensing data from the sensor;
transmitting a session key request signal from the processor to the secure element;
transmitting the session key from the secure element to the processor in response to the session key request signal; and
encrypting, by the processor, the sensing data using the session key.

11. The method of claim 1, wherein the encrypting, by the secure module, of the sensing data provided by the sensor using the session key includes:
receiving, by the processor, the sensing data from the sensor;
transmitting an encryption request signal and the sensing data from the processor to the secure element;
encrypting, by the secure element, the sensing data using the session key in response to the encryption request signal; and
transmitting the encrypted sensing data from the secure element to the processor.

12. The method of claim 1, wherein the sensor is included in the secure module.

13. The method of claim 1, wherein the application processor includes a trusted execution environment (TEE) and a rich operating system execution environment (REE), and
wherein the application processor is configured to communicate with the secure module through the trusted execution environment.

14. A method of data transfer in an electronic device including a secure module, which includes a processor, a secure element, and an application processor, comprising:
switching an operation mode of the processor to a bypass mode;
performing a cross-authentication, by the application processor and the secure element;
generating a session key, by the application processor and the secure element, when the cross-authentication is succeeded;
switching the operation mode of the processor to a normal mode;
encrypting, by the secure module, security data stored in the secure element using the session key;
transferring the encrypted security data from the processor to the application processor; and
acquiring, by the application processor, the security data by decrypting the encrypted security data using the session key.

15. The method of claim 14, wherein the encrypting, by the secure module, of the security data stored in the secure element using the session key includes:
transmitting a data request signal from the processor to the secure element;
transmitting the session key and the security data from the secure element to the processor in response to the data request signal; and
encrypting, by the processor, the security data using the session key.

16. The method of claim 14, wherein the encrypting, by the secure module, of the security data stored in the secure element using the session key includes:
transmitting a data request signal from the processor to the secure element;
encrypting, by the secure element, the security data using the session key in response to the data request signal; and
transmitting the encrypted security data from the secure element to the processor.

17. A method of data transfer in an electronic device including a secure module, which includes a processor, a secure element, an application processor, and a sensor, the method comprising:
performing a cross-authentication, by the application processor and the secure element, while bypassing the processor;

generating a session key, by the application processor and the secure element, when the cross-authentication is succeeded;

encrypting, by the secure module, sensing data provided by the sensor using the session key;

transferring the encrypted sensing data from the processor to the application processor; and acquiring, by the application processor, the sensing data by decrypting the encrypted sensing data using the session key.

18. The method of claim 17, wherein the performing of the cross-authentication while bypassing the processor includes:

activating a bypass channel configured to allow the application processor to transmit information to the secure element.

19. The method of claim 17, wherein the performing of the cross-authentication while bypassing the processor includes:

activating a bypass channel configured to allow the secure element to transmit information to the application processor.

20. The method of claim 17, wherein the performing of the cross-authentication while bypassing the processor includes:

activating a bypass channel configured to allow the application processor to transmit information to the secure element, and configured to allow the secure element to transmit information to the application processor.

* * * * *